(12) United States Patent
Carlson

(10) Patent No.: US 7,451,781 B2
(45) Date of Patent: *Nov. 18, 2008

(54) PRESSURE INDEPENDENT CONTROL VALVE

(75) Inventor: Bengt A. Carlson, Tucson, AZ (US)

(73) Assignee: Belimo Automation AG, Hinwil (CH)

( * ) Notice: Subject to any disclaimer, the term of this patent is extended or adjusted under 35 U.S.C. 154(b) by 190 days.

This patent is subject to a terminal disclaimer.

(21) Appl. No.: 11/194,636

(22) Filed: Aug. 1, 2005

(65) Prior Publication Data

US 2007/0023086 A1     Feb. 1, 2007

(51) Int. Cl.
*G05D 7/01*     (2006.01)
(52) U.S. Cl. ...................................... 137/501
(58) Field of Classification Search ................. 137/501, 137/503, 504
See application file for complete search history.

(56) References Cited

U.S. PATENT DOCUMENTS

| | | | | |
|---|---|---|---|---|
| 1,699,676 A | * | 1/1929 | Rush ........................... | 137/501 |
| 4,092,998 A | * | 6/1978 | Taplin ......................... | 137/501 |
| 4,422,470 A | * | 12/1983 | Jackson et al. .............. | 137/501 |
| 5,143,116 A | * | 9/1992 | Skoglund ..................... | 137/501 |
| 6,039,304 A | | 3/2000 | Carlson | |
| 6,827,100 B1 | | 12/2004 | Carlson | |

\* cited by examiner

*Primary Examiner*—Stephen M Hepperle
(74) *Attorney, Agent, or Firm*—Thaddius J. Carvis

(57) ABSTRACT

The invention provides valves of the type employing a differential pressure regulator and a characterized valve with a mechanism to enhance control of fluid flow independently of system pressure. The valves of the invention are especially suitable for HVAC applications, and provide operation with improved accuracy over a greater flow range with a reduced risk of hunting. In one preferred aspect, the invention provides improvements by the employment in the differential pressure regulator of a diaphragm with a cup arranged to provide a small leakage, thereby dampening the response of the regulator. In another aspect, a baffle is provided to protect the downstream side of a control disk forming part of the differential pressure regulator.

8 Claims, 3 Drawing Sheets

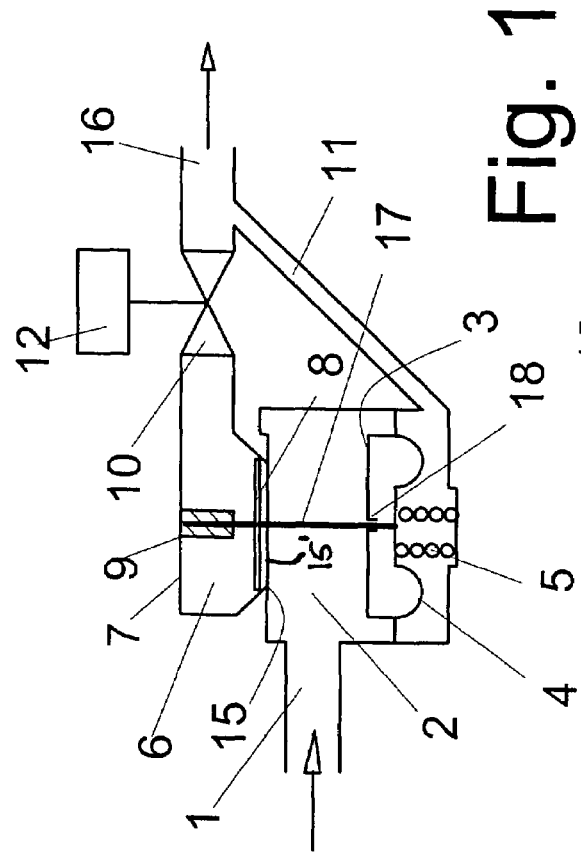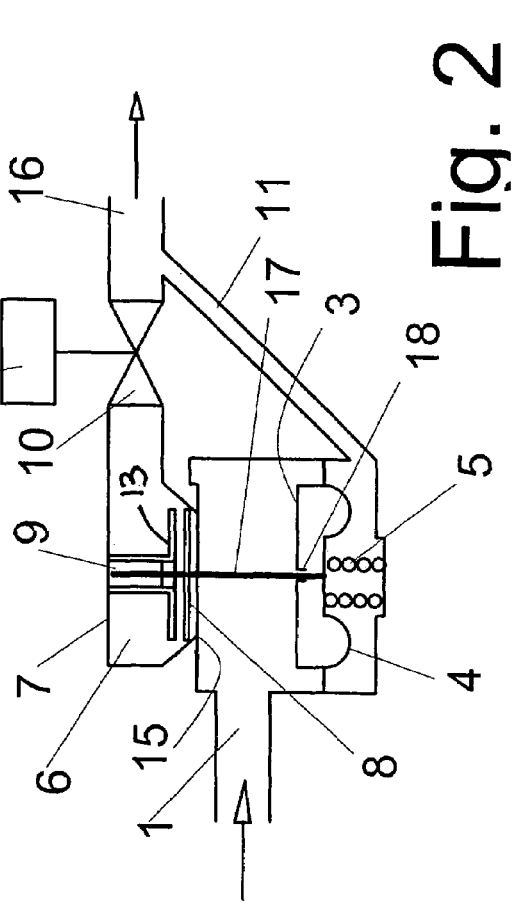

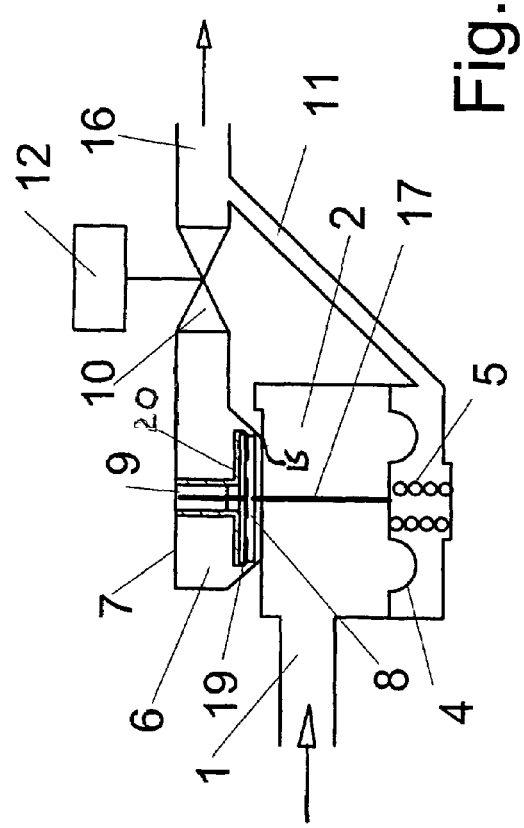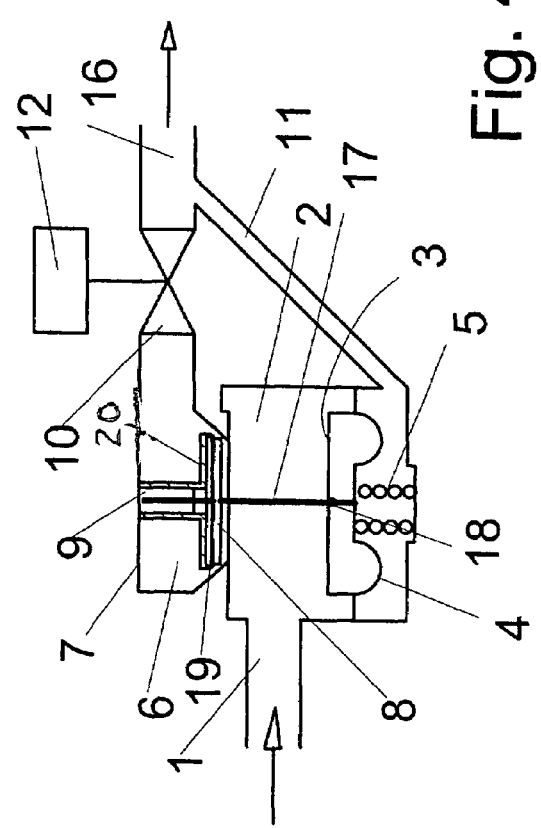

PRESSURE INDEPENDENT CONTROL VALVE

CROSS REFERENCE TO RELATED APPLICATIONS

The invention pertains to a pressure independent valve of the type described by the present applicant in and U.S. patent application Ser. No. 10/948,662, filed Sep. 23, 2004, which is a divisional of U.S. patent application Ser. No. 10/049,730, now U.S. Pat. No. 6,827,100. This invention has been described in Disclosure Document No. 541,997 and U.S. Provisional Patent Application No. 60/598,080, of the same title, filed Aug. 2, 2004, and priority to this Provisional Patent Application is hereby claimed.

BACKGROUND OF THE INVENTION

1. Field of the Invention

The invention provides valves of the type employing a differential pressure regulator and a characterized valve with a mechanism to enhance control of fluid flow independently of system pressure. The valves of the invention are especially suitable for HVAC applications, and provide operation with improved accuracy over a greater flow range with a reduced risk of hunting.

2. Description of Prior Art Related to the Invention

In HVAC plants, water distribution can be accomplished at constant or variable flow. Each type of distribution system has advantages and disadvantages. Today, variable flow systems using electronic 2-way control valves have become generally accepted as the industry standard due to their benefits, mainly reduced pumping cost achieved as a result of reducing pump head and flow.

However, a significant disadvantage with many systems in place today is that balancing the system is a time consuming and costly effort. The balancing procedure dictates the quality of the system and requires highly skilled technicians and tools. According to a typical system flow design, each control valve requires a balancing valve to adjust the hydronic circuit with all control valves must be in their open position. Then, as soon as the system is running, depending on different cooling or heating load requirements in the building, valves begin closing and opening. Each opening or closing dynamically alters system pressure, and balancing these systems becomes time consuming and can only be approximate.

If terminals are added to a typical system, the whole system requires rebalancing because some existing terminals must be throttled back. This is especially a problem where floors are periodically remodeled and the uses are varied. Wherever the uses change, balancing of the whole system is required. Moreover, a building is typically running under design conditions only a small of the time. The rest of the time, the hydronic system needs to provide an average load of only about 50%. This can mean that flow is reduced to only about 20%, and differential pressures across control valves increase. Since the CV-rating of the valve is typically sized for design conditions, the valve authority decreases and the modulating valve is downgraded to one acting open or closed only. This makes hunting expected.

Control circuits are interactive. Therefore, when one control valve closes in a system of the type described above, the differential pressures on other circuits increases and the associated control valves must close to compensate. So when one or more loops become unstable, control problems can spread to other control valves.

In typical current cooling systems, if flow is higher than required, the temperature differential of the fluid ($\Delta T$) will decrease and result in a cooling plant with lower return temperatures to the chiller and reduce the efficiency. If one chiller cannot run at peak efficiency, it is more likely that the next chiller in a series will be forced to start sooner than required causing additional electricity and maintenance costs. The opposite happens in a condensing boiler where a higher return temperature can avoid the condensing process when the dew point of the exhaust gases cannot be achieved. The same phenomenon can happen in coils. In a heating coil for instance, overflow will result in a lower $\Delta T$ and decrease the coil's performance which can result in discomfort due too a low room temperature.

Significant developments in HVAC valves have been made in the recent past with the provision of characterized valves, in general, and particularly of the pressure independent variety. Because of these improvements, many of the disadvantages of variable flow systems are largely eliminated for most HVAC-applications. The valves now available for HVAC applications include characterized openings where the degree of opening movement is proportional to flow rate. U.S. Pat. No. 6,039,304, to Carlson, et al., describes a ball valve with modified characteristics. The valve includes a disk for characterizing flow to permit a proportional of opening of the valve to correspond to a predetermined flow rate. These valves can provide essentially "equal percent" characteristics, as well as other flow characteristics, and are commercially available under the identifier of CCV. They employ a disk having a shaped opening with one side shaped to conform to the shape of the exterior of the ball or plug. The disk fits inside the port at the seat area, and is secured by a ring. The ability of a valve to provide a flow rate proportional to the movement of a valve actuator is of great advantage when manufacturing and installing both valves and the actuators.

It is also important for HVAC and other applications that control valves have the ability to maintain a constant flow rate despite pressure fluctuations in the system. Valves having this capability are now available. In U.S. Pat. No. 6,827,100, to Carlson, there is described a pressure independent control valve, which enables an HVAC operator to set flow rates for any of a plurality of zones and have the selected rates remain constant independent of variations in pressure due to variations in heat transfer demand in the several zones. These valves are commercially available under the identifier of PICCV. Pressure independent control valves of the type described in U.S. Pat. No. 6,827,100 work well over the greater part of their rated nominal flow; however, at certain pressures and flow rates, there is sometimes, especially in closed systems, a risk of oscillation.

At part-load, for instance, when a PICCV with a nominal flow of 10 GPM operates at 3 GPM, a flow of 3 GPM is maintained, and these valves provide good control with no adverse hunting. However, at higher flow rates in closed systems, oscillation can be a problem. While the problems can be addressed by providing a wide range of valve sizes and selecting valves always having an effective range, so that there would always be one that worked at the problem flow rates and pressures, it would be desirable to control the problem more directly and enable a smaller range of valve sizes to accomplish the same tasks.

There is a present need for means having the capability to simply and effectively modifying pressure independent control valves to enable to enhance control of fluid flow independently of system pressure with improved accuracy over a greater flow range with a reduced risk of hunting.

SUMMARY OF THE INVENTION

It is an object of the invention to provide improvements for pressure independent control valves of the type employing a differential pressure regulator and a characterized valve to enhance control of fluid flow and/or improve system stability independently of system pressure and/or flow rate.

It is an object of the invention to provide improvements for pressure independent control valves of the type employing a differential pressure regulator and a characterized valve to enhance control of fluid flow independently of system pressure.

It is another object of the invention to provide improvements for pressure independent control valves of the type employing a differential pressure regulator and a characterized valve to enable operation with improved accuracy over a greater flow range with a reduced risk of hunting.

In a preferred aspect, the invention provides improvements for pressure independent control valves of the type employing a differential pressure regulator and a characterized valve to enhance control of fluid flow independently of system pressure by the employment in the differential pressure regulator of a diaphragm with a cup arranged to provide a small leakage, thereby dampening the response of the regulator.

In another preferred aspect, the accuracy at higher flow rates of pressure independent valves of the type employing a differential pressure regulator and a characterized valve to enhance control of fluid flow independently of system pressure by providing a baffle to protect the downstream side of a control disk forming part of the differential pressure regulator.

According to one embodiment, a pressure independent fluid flow regulating valve providing a substantially constant flow rate for each set position, comprises: a flow passage leading to a characterized valve having an inlet from and an outlet to said flow passage; upstream of said characterized valve, a seat orifice intersecting said flow passage; a moveable assembly, comprising a disk connected to by a stem, and operated by a pressure sensing means; wherein the disk is located downstream of the seat with which it interacts to vary the flow resistance, and the effective surface area of the disk is essentially the same as the effective surface area of said pressure sensing means; downstream of the disk, a baffle is mounted in a fixed position, close to the disk but at a distance permitting the movement of the disk; the pressure sensing means operates inside a cylinder or chamber which it divides in two portions, wherein one portion is connected to the inlet, and the other portion is connected via reference pressure passage to a point downstream of the characterized valve; and spring means for biasing said moveable assembly.

According to another embodiment, a pressure independent fluid flow regulating valve providing a substantially constant flow rate for each set position, comprises: a flow passage leading to a characterized valve having an inlet from and an outlet to said flow passage; upstream of said characterized valve, a seat orifice intersecting said flow passage; a moveable assembly, comprising a disk connected to by a stem, a pressure sensing means comprising a diaphragm and a cup positioned over and covering the pressure sensing means; wherein the disk is located downstream of the seat with which it interacts to vary the flow resistance, and the effective surface area of the disk is essentially the same as the effective surface area of said pressure sensing means; the pressure sensing means operates inside a cylinder or chamber which it divides in two portions, wherein one portion is connected to the inlet, and the other portion is connected via reference pressure passage to a point downstream of the characterized valve, and the cup includes an opening permitting fluid to flow between the chamber and the pressure sensing means to provide dampening; and spring means for biasing said moveable assembly.

According to another embodiment, a pressure independent fluid flow regulating valve providing a substantially constant flow rate for each set position, comprises: a flow passage leading to a characterized valve having an inlet from and an outlet to said flow passage; downstream of said characterized valve, a seat orifice intersecting said flow passage; a moveable assembly, comprising a disk connected to, and operated by a pressure sensing means; wherein the disk is located downstream of the seat with which it interacts to vary the flow resistance and the effective surface area of the disk, is essentially the same as the effective surface area of said pressure sensing means; downstream of the disk, a baffle is mounted in a fixed position, close to the disk but at a distance permitting the movement of the disk; the pressure sensing means operates inside a cylinder or chamber which it divides in two portions, one portion is connected to the throttling device, the other portion via a reference pressure passage connected to a point upstream of the characterized valve; spring means biases said moveable assembly.

According to another embodiment, a pressure independent fluid flow regulating valve providing a substantially constant flow rate for each set position, comprises: a flow passage leading to a characterized valve having an inlet from and an outlet to said flow passage; downstream of said characterized valve, a seat orifice intersecting said flow passage; a moveable assembly, comprising a disk connected to by a stem, a pressure sensing means comprising a diaphragm and a cup is placed over and covering the pressure sensing means; wherein the disk is located downstream of the seat with which it interacts to vary the flow resistance, and the effective surface area of the disk is essentially the same as the effective surface area of said pressure sensing means; the pressure sensing means operates inside a cylinder or chamber which it divides in two portions, wherein one portion is connected to the outlet, and the other portion is connected via reference pressure passage to a point upstream of the characterized valve, and the cup includes an opening permitting fluid to flow between the chamber and the pressure sensing means to provide dampening; and spring means for biasing said moveable assembly.

Additional and preferred features of the invention will be described below with the positions of the different parts as shown in the figures.

BRIEF DESCRIPTION OF THE DRAWINGS

The invention will be further described and its advantages made more apparent when the following detailed description of the invention is read in connection with the accompanying drawings, wherein:

FIG. 1 is a schematic cross-sectional view of the improved pressure independent control valve of the present invention illustrating among other things a cup covering the upper side of the diaphragm, which works with a stem and loosely fit center hole to dampen the reaction of the regulator;

FIG. 2 is a schematic cross-sectional view of the same pressure independent control valve as in FIG. 1, but a baffle is added to the area on top of the control disk to counteract an effect of rapid fluid flow against the downstream side of a control disk.

FIG. 3 is a schematic cross-sectional view of the same pressure independent control valve as in FIG. 1, but without the cup and with a baffle with raised edges.

FIG. 4 is a schematic cross-sectional view of the same pressure independent control valve as in FIG. 3, but with a cup added to the top of the upper side of the diaphragm.

DETAILED DISCUSSION OF THE PREFERRED EMBODIMENTS OF THE INVENTION

Figure 5:
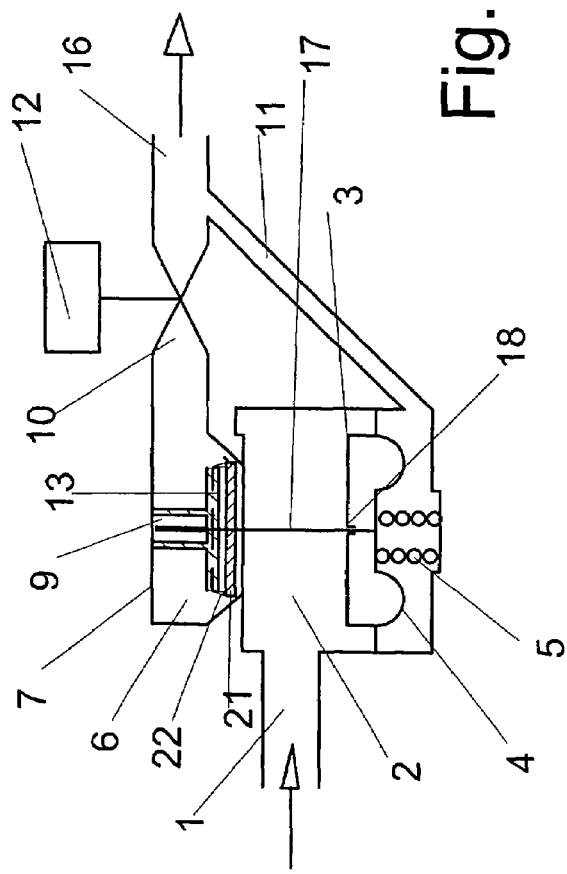
FIG. 5 is a schematic cross-sectional view of the same pressure independent control valve as in FIG. 4, but with a control disk with raised edges.

The invention is described below with regard to specific embodiments which illustrate the arrangement and function of various component parts for valves of particular interest, but the mechanisms and principals can be applied by the skilled worker to other arrangements. The invention provides both a construction capable of dampening the response of a differential pressure regulator component of a pressure independent control valve or one to counteract an effect of rapid fluid flow against the downstream side of a control disk in valves of this type. The valves of the invention can provide a characterized valve 10 either upstream or downstream of a pressure chamber 2 differential pressure regulator component. The details of the characterized valve 10 form no part of the invention, and the characterized valve 10 is illustrated here schematically only. Reference can be had to U.S. Pat. No. 6,039,304, to Carlson, et al., and U.S. Pat. No. 6,827,100, to Carlson, for specific structures of interest. The disclosures of these patents are incorporated by reference herein, in their entireties.

Referring to FIG. 1, there is shown an improved pressure independent valve of the present invention. The valve includes an inlet 1 and outlet 16. The inlet 1 communicates with a pressure chamber 2, which can communicate with a second pressure chamber 6, via a seat 15 in opening 15" and a control disk 8. The control disk 8 is connected to pressure sensing means comprising a diaphragm 4 via a stem 17. The stem 17 has an extension and is guided by a guide post 9. The guide post 9 is attached to, or a part of the valve body 7. An assembly comprising the control disk 8, stem 17 and a pressure sensing means comprising diaphragm 4 can move as one unit such that control disk 8 can move between open and closed positions as stem is moved by diaphragm 4. A spring 5 is biasing the assembly. Throughout this description alternative means, such as a piston working in a cylinder or similar pressure sensing means, can be employed in place of the diaphragm 4.

In the embodiment of FIG. 1, there is provided a cup 3 with a center hole 18 for the stem 17 to provide dampening and enhance system stability. The cup 3 is placed over and covers the upper area of the pressure sensing means comprising diaphragm 4. The center hole 18 has a diameter slightly larger than the stem 17, so the play is small and a resistance to a leakage of fluid between the diaphragm 4 and the pressure chamber 2 is created. The exact numerical value of the tolerance is not critical, and is typically large enough to provide control force to reach the diaphragm 4. The flow, being less than immediate, dampens the reaction of the pressure regulator and leads to a more stable function of the pressure independent valve.

In the embodiment of FIG. 1, a characterized control valve 10 is connected between the pressure chamber 2 and the outlet 16. The control valve 10 can be operated manually or by an actuator 12. The pressure at the outlet 16 is via a reference channel 11 brought back to the under side of the diaphragm 4 which is biased by a spring 5.

Turning now to FIG. 2, an alternative embodiment of a pressure independent valve is shown with all parts identical to the FIG. 1, except that a baffle 13 has been added. The baffle 13 is attached to the guide post 9. The baffle 13 is positioned just slightly above the highest point of the operating range of the control disk 8.

Under some conditions, jets of fluid are formed around the periphery of the control disk 8 as the fluid moves between the control disk 8 and the seat 15 of the differential pressure regulator. These jets can hit the wall of the valve body 7 and bounce back against the top of the control disk 8. The baffle 13 prevents the jets from impacting the control disk 8 so the force balance of the control disk 8 is not influenced. With the baffle 13 the accuracy of the pressure independent valve is improved, especially at higher flow rates.

Turning to FIG. 3. there is shown a pressure independent valve with all parts identical to the FIG. 1, except no cup 3 has been added and a special baffle 20 is used. The special baffle 20 has a peripheral edge (flange) 19 on the perimeter of the baffle 20. The peripheral edge 19 faces downward and has an inside diameter slightly larger than the control disk 8. This makes it possible to fit the control disk 8 inside the edge 19. This protects the inside of the control disk 8. If the play between the control disk 8 and the inside of the edge 19 is small the cup 3 can be dispensed with, as a damping action takes place between the control disk 8 and the special baffle 20.

Turning to FIG. 4, there is shown a pressure independent valve with all parts identical to the FIG. 1, including cup 3 has been added and a special baffle 20, as in FIG. 3, is used. The special baffle 20 has an edge 19 on the perimeter of the baffle 20. It faces downward and has an inside diameter slightly larger than the control disk 8. This makes it possible to fit the control disk 8 inside the edge 19. This protects the inside of the control disk 8 and a dashpot is formed, which together with the cup 3 has to the effect that the pressure regulator is dampened, and the pressure independent valve is stabilized.

Turning to FIG. 5, there is seen a pressure independent valve with all parts identical to the FIG. 1, including cup 3 has been added and a baffle 13 is used but, instead of control disk 8, a special control disk 21 is employed having an edge (flange) 22 on the perimeter of the control disk 21. The edge 22 faces upward and has an inside diameter slightly larger than the baffle 13. This makes it possible to fit the baffle 13 inside the edge 22, which protects the inside of the control disk. A dashpot is formed by these components, which work together with the cup 3 to provide the effect that the pressure regulator is dampened, and the pressure independent valve is stabilized.

Figure 6:
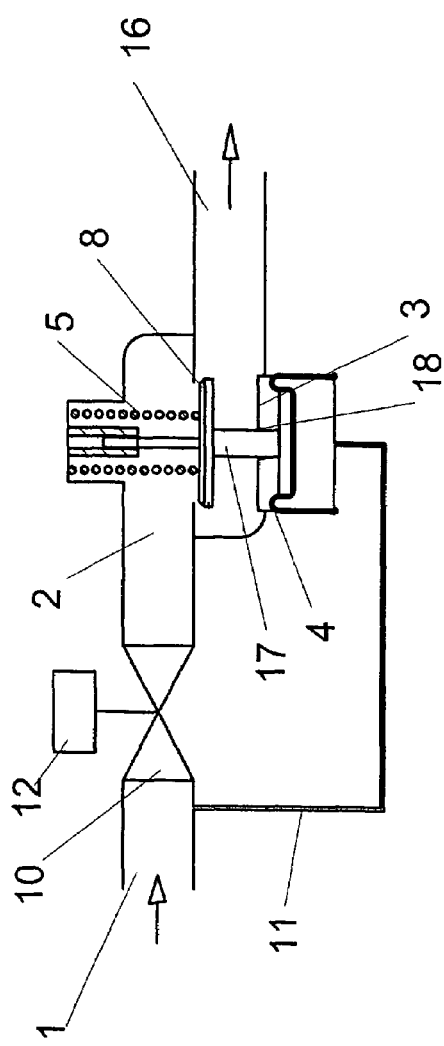
FIG. 6 is a schematic cross-sectional view of an alternative solution to the pressure independent control valve, wherein the control valve is placed before the pressure regulator and a cup has been placed so it covers the upper side of the diaphragm of the pressure regulator.

The pressure independent valve can have the control valve after or before the differential regulator as described in U.S. Pat. No. 6,827,100. Turning to FIG. 6 there is seen a pressure independent valve of the invention with the characterized valve 10 placed before the differential pressure regulator. In this embodiment, the pressure independent valve includes an inlet 1 and outlet 16. The inlet 1 communicates with the control valve 10, which can communicate with a pressure chamber 2. From there the fluid passes through the seat 15 and control disk 8 into the outlet 16. The control disk 8 is connected to a diaphragm 4 via a stem 17. The stem 17 is guided by a guide post 9. The control disk 8, stem 17 and diaphragm 4 can move as one unit. A cup 3 with a center hole 18 for the stem 17 is placed over the cup 3 which covers the upper area of the diaphragm 4. The center hole 18 has a diameter only slightly larger than the stem 17, so a resistance to the flow of fluid between the diaphragm 4 and the pressure chamber 6. This dampens the reaction of the pressure regulator and leads to a more stabile function of the pressure independent valve. The pressure at the inlet 1 is via a reference channel 11 brought to the under side of the diaphragm 4 which is biased by a spring 5.

In the various embodiments of the invention, a cup 3, a baffle 13 or 20 or a control disk 21 can be used singly or in combination. FIGS. 1, 2, 4 and 6 show different versions of a valve according to the invention wherein a cup 3 has been added over the diaphragm area of a valve of the type employing a differential pressure regulator and a characterized valve. The cup has a hole in the center for the spindle. The hole has slightly larger diameter than the spindle. The volume under the diaphragm is in communication with a reference pressure located either upstream or downstream of the valve, depending upon the type of the valve.

It is of particular advantage that the diaphragm can be enclosed by a cup or similar device to provide improved response with limited hunting. The volume on top of the diaphragm is enclosed by the cup. Fluid from the inlet or outlet can communicate with the enclosed volume through a restriction. It can be in the form of the play between the spindle and the hole. The restriction is the leakage between the two. Or, it can be a very tight play between the spindle and the hole in the cup, so there will be a very small leakage and then use a very fine opening in the cup as a restriction. However, the first alternative is preferred.

The cup described above has advantageous effect that the short term pressure variations over the valve and thereby the diaphragm can be attenuated. This improves the stability of the differential pressure regulator and can eliminate the hunting that otherwise can occur when the pressure and the flow is getting too high.

The flow of fluid is controlled by a control disk and a seat in the differential pressure regulator. It is another advantage of the invention that this control disk can be shielded by a baffle or shield, mounted over the top of the control disk so that it is covered and protected from downward jets of fluid. These downward jets of fluid are caused by fluid flowing from the periphery of the control disk and the seat of the differential regulator hitting the wall of the regulator and moving back against the top of the control disk. It is an advantage of the invention that the baffle prevents the jets from impacting the control disk so the force balance of the control disk is not influenced.

It is an advantage of the invention that the baffle enhances the accuracy of the pressure independent valve, especially at higher flows. The baffle is preferably firmly attached to the wall or guide past of the valve body.

The bottom part of the baffle is situated just slightly above the highest position of the movement of the control disk. This provides the benefit that water can pass between the top side of the baffle and the wall of the differential pressure regulator. In a preferred form, the baffle is a disk with a stand off that also works as a fastening device. The fastening device can attach to the wall of the valve body or to the guide post.

The baffle can be a simple disk or have raised edges, so it forms a cylindrical cup. The edges preferably face the control disk. If the edge has a diameter slightly larger than the control disk, it can partially operate inside the baffle and a damping mechanism has been accomplished.

As an alternative, the control disk can have raised edges, so that it forms a cylindrical cup. In this case the edges face the baffle. If the edges have a diameter slightly larger than the baffle so that it can partially operate inside the control disk and a damping mechanism has been accomplished.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims and, in some instances, some features of the invention will be employed without the corresponding use of the other features. The claims are meant to cover the indicated elements and steps in any arrangement or sequence that is effective to meet the objectives intended for the invention, unless the context specifically indicates the contrary.

The invention claimed is:

1. A pressure independent fluid flow regulating valve providing a substantially constant flow rate for each set position, comprises:

a flow passage leading to a characterized valve wherein the degree of opening movement is proportional to flow rate having an inlet from and an outlet to said flow passage; upstream of said characterized valve, a seat orifice intersecting said flow passage;

a moveable assembly, comprising a disk connected to by a stem, and operated by a pressure sensing means;

wherein the disk is located downstream of the seat with which it interacts to vary the flow resistance, and the effective surface area of the disk is essentially the same as the effective surface area of said pressure sensing means;

downstream of the disk, a baffle is mounted in a fixed position parallel to the disk, close to the disk but at a distance permitting the movement of the disk;

the pressure sensing means operates inside a cylinder or chamber which it divides in two portions, wherein one portion is connected to the inlet, and the other portion is connected via reference pressure passage to a point downstream of the characterized valve; and spring means for biasing said moveable assembly.

2. A pressure independent fluid flow regulating valve providing a substantially constant flow rate for each set position, comprises:

a flow passage leading to a characterized valve having an inlet from and an outlet to said flow passage; upstream of said characterized valve, a seat orifice intersecting said flow passage;

a moveable assembly, comprising a disk connected to by a stem, a pressure sensing means comprising a diaphragm and a cup positioned over and covering the pressure sensing means;

wherein the disk is located downstream of the seat with which it interacts to vary the flow resistance, and the effective surface area of the disk is essentially the same as the effective surface area of said pressure sensing means;

the pressure sensing means operates inside a cylinder or chamber which it divides in two portions, wherein one portion is connected to the inlet, and the other portion is connected via reference pressure passage to a point downstream of the characterized valve, and the cup includes an opening permitting fluid to flow between the chamber and the pressure sensing means to provide dampening; and spring means for biasing said moveable assembly.

3. A pressure independent fluid flow regulating valve providing a substantially constant flow rate for each set position, comprises:
- a flow passage leading to a characterized valve having an inlet from and an outlet to said flow passage;
- downstream of said characterized valve, a seat orifice intersecting said flow passage; a moveable assembly, comprising a disk connected to, and operated by a pressure sensing means;
- wherein the disk is located downstream of the seat with which it interacts to vary the flow resistance and the effective surface area of the disk, is essentially the same as the effective surface area of said pressure sensing means;
- downstream of the disk, a baffle is mounted in a fixed position parallel to the disk, close to the disk but at a distance permitting the movement of the disk;
- the pressure sensing means operates inside a cylinder or chamber which it divides in two portions, one portion is connected to the throttling device, the other portion via a reference pressure passage connected to a point upstream of the characterized valve; and
- spring means biases said moveable assembly.

4. A pressure independent fluid flow regulating valve providing a substantially constant flow rate for each set position, comprises:
- a flow passage leading to a characterized valve having an inlet from and an outlet to said flow passage;
- downstream of said characterized valve, a seat orifice intersecting said flow passage; a moveable assembly, comprising a disk connected to by a stem, a pressure sensing means comprising a diaphragm and a cup is placed over and covering the pressure sensing means;
- wherein the disk is located downstream of the seat with which it interacts to vary the flow resistance, and the effective surface area of the disk is essentially the same as the effective surface area of said pressure sensing means;
- the pressure sensing means operates inside a cylinder or chamber which it divides in two portions, wherein one portion is connected to the outlet, and the other portion is connected via reference pressure passage to a point upstream of the characterized valve, and the cup includes an opening permitting fluid to flow between the chamber and the pressure sensing means to provide dampening; and
- spring means for biasing said moveable assembly.

5. Pressure independent valve according any of claims 1 or 3, wherein the baffle has an edge on the side facing the disk.

6. Pressure independent valve according any of claims 1 or 3, where the disk has an edge on the side facing the baffle.

7. Pressure independent valve according to any of claims 1 or 3, where a cup covers one side of the pressure sensing means and includes a small opening acting as a resistance to the fluid.

8. Pressure independent valve according to claim 7, where the resistance to the fluid is in the form of the play between the cup and a spindle passing a hole in the clip.

* * * * *